Patented Feb. 27, 1934

1,948,894

UNITED STATES PATENT OFFICE 1,948,894

NEW CONDENSATION PRODUCTS

Max Weiler, Wiesdorf - on - the - Rhine, and Berthold Wenk and Hermann Stötter, Leverkusen-on-the-Rhine, Germany, assignors to I. G. Farbenindustrie Aktiengesellschaft, Frankfort-on-the-Main, Germany, a corporation of Germany No Drawing. Application February 27, 1930, Serial No. 431,968. In Germany March 4, 1929

7 Claims. (Cl. 260—64)

The present invention relates to new condensation products and to a process for preparing same.

According to the process of the present invention condensation products from aldehydes and phenols are obtainable by reacting upon about 1 mol. of an aldehyde with about one mol. of a phenol of the general formula:

wherein X stands for halogen or alkyl, in the presence of condensing agents. As condensing agents the following compounds may be mentioned: alkali metal hydroxides and carbonates and similar alkaline reacting compounds, and sulfuric acid, oleum, zinc chloride and other acid condensing agents.

The alcohol or hydrol obtained is then condensed with about one mol. of phenol in the presence of an acid condensing agent. When using the same phenol in both stages of the condensation, symmetrical compounds are obtained, but when using two different phenols, asymmetrical compounds will be obtained.

It is evident that it is not necessary for the purpose of the present invention to start always from the phenol and to condense this phenol with an aldehyde and to condense the product obtained once more with a phenol; it is also possible to start from the respective alcohol, hydrol or a substitution product thereof in which the substitution has taken place in the alcoholic OH-group, such as, for instance —CH$_2$Cl, or —CH$_2$.OCH$_3$, —CH$_2$OC$_2$H$_5$, or acyl compounds, such as for instance:

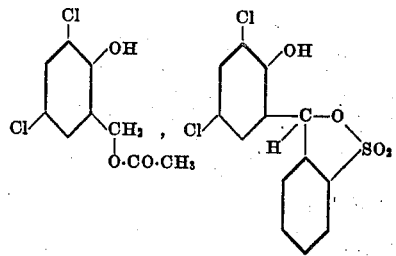

According to this feature of the invention a compound of the general formula:

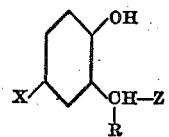

wherein X stands for halogen or alkyl and wherein R stands for H or aryl, and Z for OH, halogen, O-alkyl, o-acyl, and wherein the benzene nuclei may be further substituted, is condensed with a phenol in the presence of an acid condensing agents, such as sulfuric acid, zinc chloride.

The products obtainable according to both features of the invention are colorless or nearly colorless powders, soluble in alkalies and insoluble or nearly insoluble in water with the exception of the compounds containing a sulfonic acid group, being valuable reserving agents and mothproofing media, and preventing rotting of canned goods, glue, paste, and so on.

The invention is illustrated by the following examples, without being limited thereto:

*Example 1.*—31.2 parts by weight of sodium benzaldehyde-o-sulfonate are introduced into 310 parts by weight of oleum (11%). Then 24.5 parts by weight of 2.4-dichlorophenol are run in with ice cooling in the course of 6 hours; stirring is continued for a further 12 hours at 20–25° C. after which heating takes place for a short time. On dropping in 480 parts by weight of sulfuric acid of 60° Bé. the hydrol anhydride is precipitated in the form of a fine powder. After cooling this is filtered, made into a paste twice with sulfuric acid of 60° Bé., filtered and washed with ice-water. This hydrol anhydride is insoluble in water. On heating with diluted acid it dissolves, presumably with the formation of the very readily soluble free hydrol sulfonic acid. The orange-red coloration produced on covering the anhydride with caustic soda lye is very characteristic. On stirring this coloration disappears again. The sulfonic acid is not precipitated on acidification. Only on heating with strong sulfuric acid or hydrochloric acid the free sulfonic acid is dehydrated again and thus precipitated as the anhydride. The free sulfonic acid gives a violet coloration with ferric chloride.

Analytical examination shows

Hydrolanhydride: 21.1% Cl; 9.9% S
Calculated : 21.4% Cl; 9.72% S

For the condensation with a second molecule of a phenol the isolated hydrol anhydride can be used. The isolation is, however, not essential. The sulfuric acid is diluted to the required suitable concentration, a second molecule of a phenol is added and condensed, as described in U. S. Patent No. 1,707,181, and the hydroxytriarylmethane produced is isolated.

On dilution of the sulfuric acid to about 90%, addition of a second molecule of 2.4-dichlorophenol and condensation a product is obtained, which is identical with that obtainable from benzaldehyde-o-sulfonic acid and two molecules of 2.4-dichlorophenol.

On condensing the hydrol with p-chlorophenol in sulfuric acid of 60° Bé. at 40° C. and finally for a short time at 80° C. there is obtained the trichlorodihydroxytriphenylmethane sulfonic acid, the sodium salt whereof is more readily soluble than that of the tetrachloro homologue. The calcium and ferric salts are very sparingly soluble, but even so somewhat more readily soluble than those of the tetrachloro derivative.

Example 2.—The condensation of o-sulfobenzaldehyde with one molecule of 2.4.5-trichlorophenol to the hydrolanhydride proceeds as in Example 1. When the condensation is complete the sulfuric acid is diluted to about 50% and heating to 90–95° C. is effected for 15 minutes. 78.5% of the theoretical yield of hydrol anhydride are isolated. The properties thereof are very similar to those of the product described in Example 1.

25 grs. of hydrol anhydride are stirred at a somewhat higher temperature with 14.3 grs. of 2.4-dichlorophenol in sulfuric acid of about 88% strength until no further increase in the quantity of hydroxy triphenylmethane occurs. The pentachloro product, isolated as the sodium salt likewise forms very sparingly soluble calcium and ferric salts.

Example 3.—14.1 parts by weight of p-chlorophenol are introduced first into 200 parts by weight of a 50% sulfuric acid while stirring, 16.9 parts by weight of 2-oxy-3.5-dichloro-benzyl-alcohol are then added thereto, and the whole mixture is stirred for about 20 hours at 55–60° C. The mass, in which the reaction product finally has been separated as crystals, is freed from the chlorophenol being still present by means of steam. After recrystallizing from benzene or glacial acetic acid the 2.2'-dihydroxy-3.5.5'-trichloro-diphenylmethane obtained melts at a temperature of about 187° C. Instead of p-chlorophenol also p-cresol and the like can be used in this process.

In the same manner the 2-hydroxy-5-chlorobenzyl-alcohol is condensed with p-chloro-phenol to 2.2'-dihydroxy-5.5'-dichloro-diphenyl-methane being identical with that mentioned in U. S. Patent No. 1,707,181.

Example 4.—8.1 parts by weight of 2-hydroxy-3.5-dichloro-benzyl-alcohol, 6.2 parts by weight of p-chloro-phenol and 2 parts by weight of zinc chloride are heated slowly to about 170° C. At the end of the reaction the mass dissolved in a caustic soda lye is carried into an excess of mineral acid and then freed from p-chlorophenol being still present by means of steam. The 2.2'-dihydroxy-3.5.5'-trichloro-diphenyl-methane filtered from the steam remainder melts after recrystallization at a temperature of about 187° C. and it is identical with the product of Example 3.

Example 5.—50 parts by weight of 2-hydroxy-3.5-dichloro-benzyl-chloride, 35 parts by weight of p-chloro-phenol and 3 parts of zinc-chloride are heated to a temperature of about 80–90° C. After the development of hydrochloric acid is finished, the temperature is increased to 130–140° C.

The mixture is treated as mentioned in Example 4. The reaction products are identical.

We claim:

1. Process for preparing condensation products comprising condensing about 1 mol. of a compound of the general formula:

wherein X stands for halogen or alkyl and wherein the benzene nucleus may be further substituted by halogen or alkyl with about 1 mol. of an aldehyde, and condensing the condensation product with a mol. of a phenol being different from the first one and which may be substituted by halogen or alkyl.

2. Process for preparing condensation products comprising condensing about 1 mol. of a compound of the general formula:

wherein X stands for halogen or alkyl and wherein the benzene nucleus may be further substituted by halogen or alkyl with about 1 mol. of an aldehyde in the presence of a condensing agent of the group consisting of acid and alkaline condensing agents, and condensing the condensation product with about 1 mol. of a phenol being different from the first one and which may be substituted by halogen or alkyl, in the presence of an acid condensing agent.

3. Process for preparing condensation products comprising condensing about 1 mol. of a compound of the general formula:

wherein the benzene nucleus may be further substituted by halogen or alkyl with about 1 mol. of an aromatic aldehyde in the presence of oleum, and condensing the condensation product with about 1 mol. of another phenol, different from the one used in the first stage, in the presence of sulfuric acid.

4. Process for preparing a condensation product comprising heating 1 mol. of sodium benzaldehyde-o-sulfonate with 1 mol. of 2.4-dichlorophenol in the presence of oleum of about 11% SO₃ for about 12 hours at about 20–25° C., diluting the acid solution to a sulfuric acid of about 60° Bé., adding 1 mol. of p-chloro-phenol and heating to 40–80° C. and isolating the product obtained.

5. As new products the compounds of the general formula:

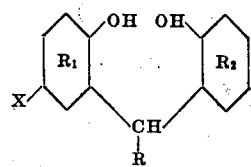

wherein R stands for H or an aryl radical and wherein X stands for halogen or alkyl, wherein the hydroxybenzene nuclei may be further substituted by halogen or alkyl, the nuclei $R_1$ and $R_2$ being different from each other, said products being colorless or nearly colorless powders, soluble in alkalies and insoluble or nearly insoluble in water with the exception of the compounds containing a sulfonic acid group, being valuable preserving agents and moth-proofing media.

6. As new products the compounds of the general formula:

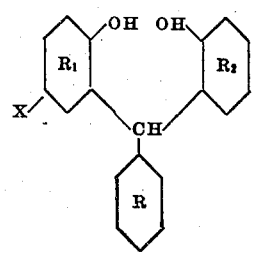

wherein X stands for halogen or alkyl and wherein the hydroxybenzene nuclei may be further substituted by halogen or alkyl, the nuclei $R_1$ and $R_2$ being different from each other, said products being colorless or nearly colorless powders, soluble in alkalies and insoluble in water with the exception of the compounds containing a sulfonic acid group, being valuable preserving agents and moth-proofing media.

7. As a new product:

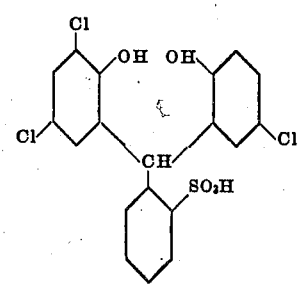

said product being a colorless powder soluble in alkalies and in water being a valuable preserving agent and a moth-proofing medium.

MAX WEILER.
BERTHOLD WENK.
HERMANN STÖTTER.